United States Patent
Theobald

(10) Patent No.: US 10,171,775 B1
(45) Date of Patent: Jan. 1, 2019

(54) AUTONOMOUS VEHICLE VISION SYSTEM

(71) Applicant: Daniel Theobald, Somerville, MA (US)

(72) Inventor: Daniel Theobald, Somerville, MA (US)

(73) Assignee: VECNA TECHNOLOGIES, INC., Cambridge, MA (US)

( * ) Notice: Subject to any disclaimer, the term of this patent is extended or adjusted under 35 U.S.C. 154(b) by 974 days.

(21) Appl. No.: 13/906,549

(22) Filed: May 31, 2013

(51) Int. Cl.
*H04N 7/18* (2006.01)

(52) U.S. Cl.
CPC .................. *H04N 7/181* (2013.01)

(58) Field of Classification Search
CPC ......... B60R 1/00; G08B 11/022; H04N 7/181
USPC ............ 348/47, 135, 148; 382/104; 345/419
See application file for complete search history.

(56) References Cited

U.S. PATENT DOCUMENTS

| | | | |
|---|---|---|---|
| 6,993,159 B1 * | 1/2006 | Ishii | B60R 1/00 345/419 |
| 2008/0040004 A1 * | 2/2008 | Breed | B60R 21/0134 701/45 |
| 2011/0046784 A1 * | 2/2011 | Anderson | G05D 1/0251 700/259 |
| 2012/0185167 A1 * | 7/2012 | Higuchi | G01C 21/3602 701/461 |
| 2013/0194256 A1 * | 8/2013 | Gassmann | G08G 1/163 345/419 |
| 2013/0286193 A1 * | 10/2013 | Pflug | B60R 1/00 348/135 |

\* cited by examiner

*Primary Examiner* — Mishawn N Hunter

(57) ABSTRACT

In accordance with one aspect of the invention, there is provided a method of autonomously operating a vehicle. The method provides at least two cameras in operable communication with the vehicle for providing substantially similar views relative to the vehicle. The at least two cameras receive information relating to the views. The method also provides a laser in operable communication with the vehicle for selectively shining a single discrete mark on at least a portion of the views provided by the at least two cameras. Further, the method determines whether the information received by the at least two cameras is ambiguous regarding the views. The method activates the laser on at least a portion of the views based on whether the information received by the at least two cameras is ambiguous.

15 Claims, 6 Drawing Sheets

AUTONOMOUS VEHICLE VISION SYSTEM

FIELD OF THE INVENTION

The present invention relates generally to vision systems for autonomous vehicles such as a robot or the like and, in at least one embodiment, to such vision systems that accurately determine the distance a vehicle may be from another item/object, or whether the item/object is in the field of the vehicle.

BACKGROUND OF THE INVENTION

Autonomous vehicles such as robots or other vehicles typically need the ability to recognize and steer around objects that may be in its path. To assist in accomplishing such tasks, various types of cameras or the like can be used.

When an object has depth or texture to it, cameras typically are able to determine the distance between the robot and the object and readily identify and/or steer around it as desired. When an object has little if any depth to it, such as a flat wall, for example, recognizing the object can present difficulties.

SUMMARY OF THE INVENTION

In accordance with one embodiment of the invention, a method of autonomously operating a vehicle provides at least two cameras in operable communication with the vehicle for providing substantially similar views relative to the vehicle. The at least two cameras receive information relating to the views. The method also provides a laser in operable communication with the vehicle for shining a single discrete mark on at least a portion of the views provided by the at least two cameras. Further, the method determines whether the information received by the at least two cameras is ambiguous regarding the views. The method activates the laser on at least a portion of the views based on whether the information received by the at least two cameras is ambiguous.

In some embodiments, the method provides the at least two cameras for providing overlapping views relative to the vehicle. The views relative to the vehicle may overlap by at least a threshold percentage. The views relative to the vehicle may have fields of view that overlap by at least a threshold angle. In some embodiments, the laser shines a dot, a square, a diamond, or an irregular shape. The discrete mark may have a curvature, a straight edge, and/or both. In many embodiments, the discrete mark has a solid interior.

The method may determine whether the information relating to the views is ambiguous in any of a number of ways. For example, the information may be ambiguous if a result of a formula (when inputs based on the information in the substantially similar views are used in the formula) exceeds a predetermined threshold. In another example, the information may be ambiguous if the distance to an object in the views cannot be logically determined.

In some embodiments, the method activates the laser at least or only when the information is ambiguous. The method may not activate the laser when the information is not ambiguous.

BRIEF DESCRIPTION OF THE DRAWINGS

The following detailed description will be better understood when read in conjunction with the appended drawings in which there is shown one or more of the multiple embodiments of the present disclosure. It should be understood, however, that the various embodiments of the present disclosure are not limited to the precise arrangements and instrumentalities shown in the drawings.

DETAILED DESCRIPTION OF THE INVENTION

Figure 1:
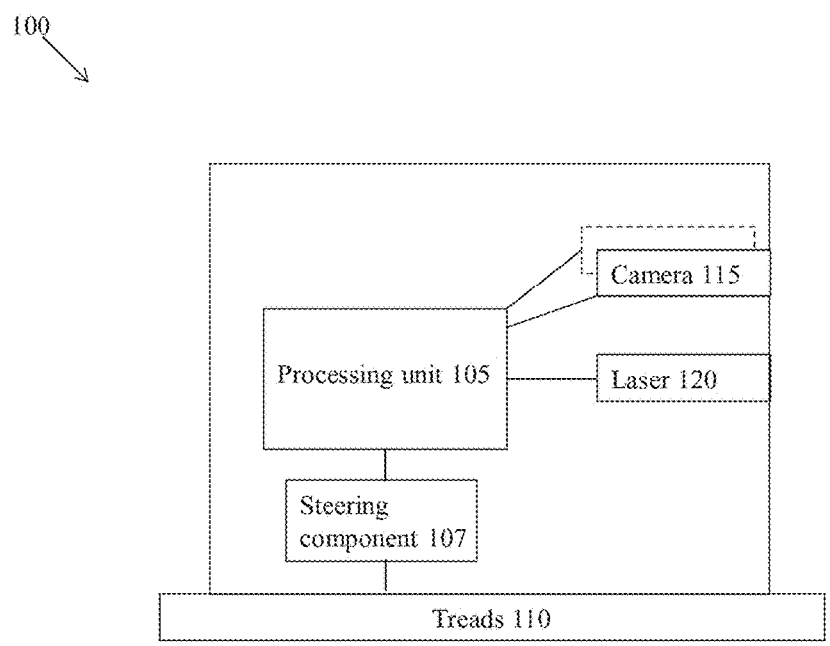
FIG. 1 is a block diagram of an exemplary vehicle equipped with a processing unit coupled to two cameras and a laser.

Embodiments of the present invention will be described below with reference to the accompanying drawings. It should be understood that the following description is intended to describe exemplary embodiments of the invention, and not to limit the invention.

Autonomous vehicles, such as robots, can be deployed to perform tasks in locations that are remote and/or risky. In various examples, vehicles may be used to clear debris from a site impacted by a natural disaster, such as a hurricane, earthquake, or tornado. Vehicles may also be deployed to retrieve the bodies of injured soldiers from a war zone. Further, vehicles may clean up or remove dangerous substances, such as radioactive material or hazardous biological waste, from sites.

In many situations, vehicles are sent to locations with little or unreliable infrastructure. As a result, the vehicles may have only intermittent access to energy sources, such as electricity grids or fueling stations. Further, the vehicles' tasks may require them to remain on-site for extended periods of time. Thus, it is advantageous for vehicles to use their energy efficiently so that they may accomplish as much as possible in the field before personnel must retrieve the vehicles for refueling, maintenance, and/or repair.

The ability for a robot to move faster through its environment is also one of many aspects of the present invention that directly relates to energy savings. The more a robot is slowed down during operation by an abnormality in its vision system the more energy is used for the robot to complete its task. Additionally, constantly using a laser for distance or other article determination in conjunction with cameras has the potential to use more energy since integration of the two systems can take time and energy and may create more anomalies than otherwise may occur when merely using cameras.

Vehicles often use cameras to recognize objects that may be in their paths. In some situations, by processing image data from the cameras, a vehicle is able to determine the distance to an object in its path and steer itself around the object accordingly, or take some other action. However, in some situations, a vehicle cannot determine a distance based solely on the image data. To overcome this problem, in illustrative embodiments, the vehicle operates a laser to project a known mark onto its environment. When the mark illuminates the object, optics (e.g., cameras) can visualize the mark and thus, with corresponding logic, determine the distance to the object. Accordingly, by causing its camera(s) to process the optical image data after illuminating a portion of the object, the vehicle may determine the distance to the object. For example, the vehicle may determine that the object is sufficiently distant that the vehicle does not need to alter the direction of its course.

Although projecting the laser's mark can be useful to the vehicle, powering the laser too often may unnecessarily drain the vehicle's power supply. To avoid depleting the vehicle's power supply, the vehicle operates the laser only when the vehicle cannot determine the distance to an object using routine processing of image data from its cameras.

FIG. 1 depicts an exemplary vehicle 100 according to one embodiment of the present invention. The vehicle 100 has a processing unit 105 that controls the operations of the vehicle's 100 components. In this embodiment, the processing unit 105 is coupled to a steering component 107 that positions the vehicle's treads 110a, 110b (collectively "110"), although in other embodiments, the steering component 107 is coupled to any other type of component that enables the vehicle to move (e.g., wheels).

The processing unit 105 is coupled to at least two cameras 115a, 115b (referred to collectively as "115") and a laser 120. In some embodiments, the cameras 115 are mounted on the vehicle 100, whereas in other embodiments, the cameras 115 are incorporated into the body of the vehicle 100. Likewise, the laser 120 may be mounted on the vehicle 100 or incorporated therein.

Figure 2:
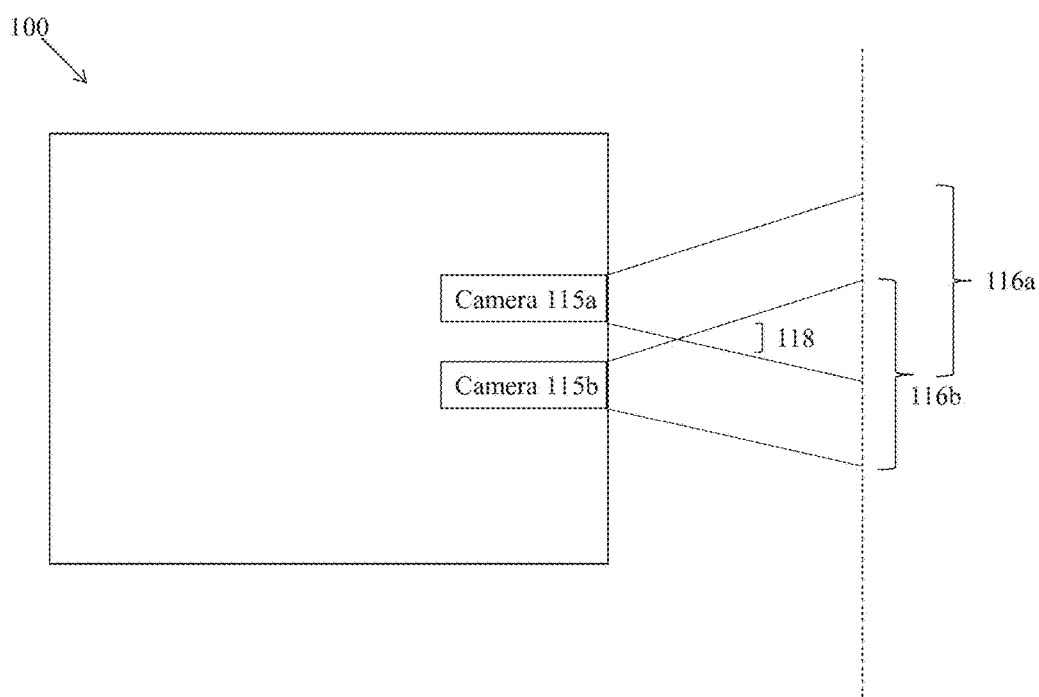
FIG. 2 is a block diagram of an exemplary vehicle with cameras facing the same direction and are sufficiently close such that the cameras capture substantially similar views of the vehicle's environment.

The cameras 115 and laser 120 may face substantially the same direction. In some embodiments, the cameras 115 are positioned such that their image sensors are substantially parallel. Further, both cameras 115 may be aligned with the front edge of the vehicle 100. The cameras 115 may be sufficiently close together so that their image sensors capture substantially similar views. FIG. 2 depicts this overhead view of the vehicle 100, the cameras 115, and the fields of view 116a and 116b of the cameras 115. The views may be substantially similar if at least a portion of the views overlap. For example, the views may be substantially similar if more than 60% of the view captured by one camera 115a is also present in the view captured by the other camera 115b, although other thresholds of overlap may be used. In some embodiments, the views may be substantially similar if an angle 118 created by the fields of view of the cameras 115 exceeds a threshold. For example, if the fields of view of the cameras 115 create an angle 118 greater than 45 degrees, the cameras' 115 views may be substantially similar.

Figure 3:
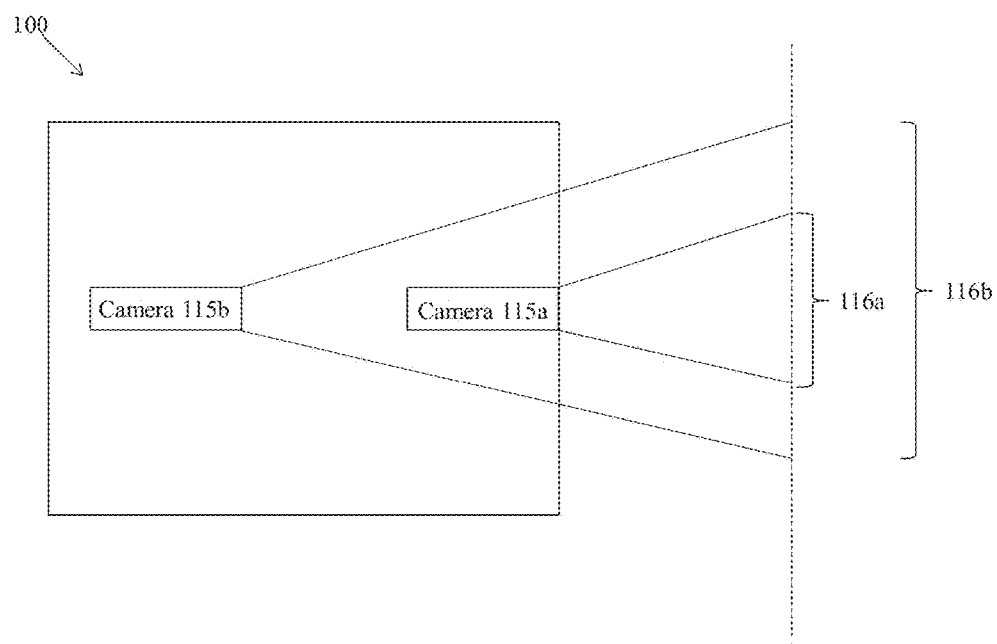
FIG. 3 is a block diagram of an exemplary vehicle with cameras facing the same direction and are positioned behind one another such that the field of view of one camera encompasses the field of view of the other camera, thus capturing substantially similar views of the vehicle's environment.

In some embodiments, the cameras 115 are positioned such that their image sensors are substantially parallel. For example, one camera 115b may be positioned behind the other camera 115a along the body of the vehicle 100 so that one camera's field of view 116b encompasses the other camera's field of view 116a. FIG. 3 depicts this overhead view of the vehicle 100, the cameras 115a and 115b, and the fields of view 116a and 116b of the cameras 115. In these embodiments, the cameras 115 capture substantially the same field of view, although they are disposed at different distances from objects in the vehicle's 100 path.

Figure 4:
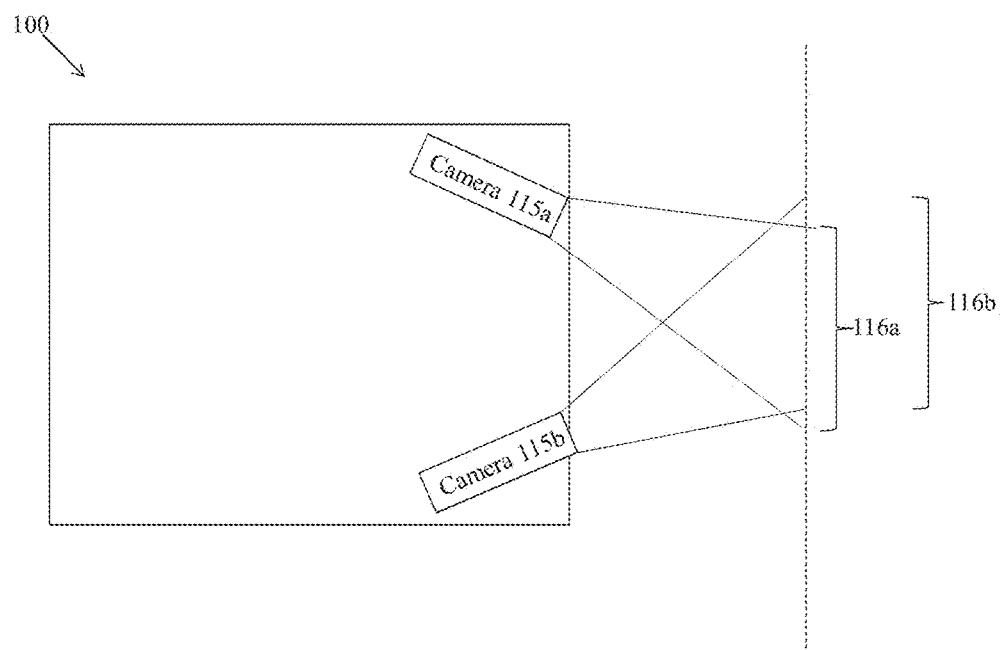
FIG. 4 is a block diagram of an exemplary vehicle with cameras angled towards one another such that a portion of their field of views intersect, thus capturing substantially similar views of the vehicle's environment.
Figure 5:
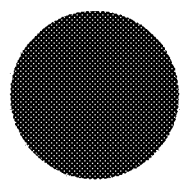
FIGS. 5-10 depict exemplary discrete marks that the laser 120 could project.
Figure 6:
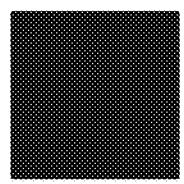
Figure 7:
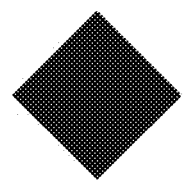
Figure 8:
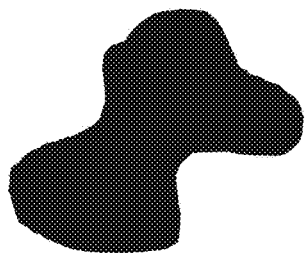
Figure 9:
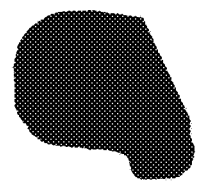
Figure 10:
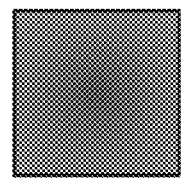

In some embodiments, the cameras 115 are positioned such that their image sensors are angled towards one another. The cameras 115 may be spaced apart on the vehicle 100, and due to their angles, their fields of view intersect so that the cameras 115 captures substantially similar views of the environment in front of the vehicle 100. FIG. 4 depicts this overhead view of the vehicle 100, the cameras 115, and the fields of view 116a and 116b of the cameras 115.

The cameras 115 may include any kind of image sensor for capturing image data. For example, the cameras 115 may include charge coupled devices (CCD) for capturing image data. In another example, the cameras 115 may include complementary metal-oxide-semiconductor (CMOS) active pixel sensors. The laser 120 may be any of a wide variety of different kinds of lasers that project a light ray. Exemplary lasers may include gas lasers, chemical lasers, excimer laser, solid state lasers, photonic crystal lasers, or semiconductor lasers.

In operation, the cameras 115 capture image data and send the data to the vehicle's processing unit 105. The processing unit 105 uses this data to attempt to identify one or more objects in the vehicle's 100 path. The processing unit 105 may use any number of image processing algorithms to determine whether the image data from the cameras 115 contains one or more objects in the vehicle's 100 pathway, and whether the processing unit 105 can determine the distance between the vehicle 100 and the object(s). In some situations, the presence of an object and/or the ability to determine the distance to the object may be ambiguous.

If either one is ambiguous, the processing unit 105 activates a laser 120 to shine a discrete mark. The discrete mark presumably impinges upon an object in the vehicle's 100 path, consequently illuminating a portion of the object. The processing unit 105 therefore determines the distance to the object based on the discrete mark; i.e., its cameras 115 locate the mark, which enables the system to determine the distance to, or presence of, the object. Conversely, if the presence of the object or the ability to determine the distance to the object is not ambiguous, the processing unit 105 does not activate the laser 120, but determines the distance from the cameras' 115 image data.

In some embodiments, the processing unit 105 only processes a portion of the image data, e.g., the portion corresponding to the projected pathway of the vehicle 100. For example, the processing unit 105 may process only the image data within the central 60% of each camera's 115 view, thereby ignoring image data at the periphery of the views.

The laser 120 preferably projects the light ray as a discrete mark. In some embodiments, the discrete mark is a dot, a square, a diamond, or an irregular shape. The discrete mark may have a curvative. The discrete mark may have a straight edge. In some embodiments, the discrete mark has a solid interior, whereas in other embodiments, the discrete mark has a patterned interior. FIGS. 5-10 depict exemplary discrete marks that the laser 120 could project.

Using a discrete mark also enables more accurate identification of the laser by the cameras in a variety of light conditions that other lasers without such a discrete mark or a pattern may not be able to handle. For example, it has been found that environments where the lighting is bright such as sunlight or where there may be reflections or other conditions do not deter laser identification by cameras when the laser projects such discrete marks.

In some embodiments, the vehicle 100 stores a template in memory corresponding to the discrete mark. The template solely may include the shape of the discrete mark, whereas in other embodiments, the template includes grayscale values regarding the interior of the discrete mark.

The processing unit 105 may activate the laser 120 to project the discrete mark for a predetermined period of time (e.g., 500 ms, 1 s). In some embodiments, the processing unit 105 may operate the laser 120 until the processing unit 105 identifies shapes corresponding to the laser's 120 discrete mark in views for both cameras 105. For example, the processing unit 105 may detect edges in the image data and compare the edges to the template shape. In another example, the processing unit 105 may compare grayscale values in the image data with grayscale values in the template for the discrete mark. Once the processing unit 105 identifies the marks in the image data, the processing unit 105 deactivates the laser 120.

The processing unit 105 determines the distance to the object upon which the discrete mark impinges. The processing unit 105 may determine the distance according to any number of algorithms, such as stereo vision algorithms.

The vehicle 100 may be calibrated before being deployed. For example, the vehicle 100 may be placed in front of different objects at different distances. In these situations, the distance between the vehicle 100 and an object upon which the discrete mark impinges, the offset of the discrete mark between images, and the angles are known. From these known quantities, the factor may be calculated and stored, and thus used for future calculations of distance.

In some embodiments, the processing unit 105 determines the distance to the object using image data from a single camera 115*a* or 115*b*. The processing unit 105 may compute the distance as:

distance to object (mm)=((focal length (mm)*real height of the discrete mark (mm)*height of sensor (pixels))/(object height (pixels)*sensor height (mm))

Use of a discrete laser mark also enables a human to be able to more accurately interact with the robot, particularly in the rare occasion when the robot gets hung up on an anomaly that cannot be resolved by the current system. In such situations, a human can view the scene in person or perhaps via one or more of the cameras from the robot and see from the laser what particular item is causing confusion. Remote viewing of the cameras can take place on any type of handheld device, PC or other type of visual interface device or the like. If desired, the laser can also be activated to provide a message to a human rather than a mere discrete mark to help interact and communicate with the human. This message, image, note or the like can take on a variety of forms as desired.

In yet another embodiment, closing the loop between the laser and the camera system to verify what each is identifying can be an important feature for a number of reasons. For example if the cameras identify some type of anomaly, having the laser shine on the right anomaly the cameras have provides additional verification which provides an additional speed, quality or safety control feature. This confirmation between the cameras and the laser comes into play in a number of situations including, for example, when say a pick and place or other robot may be using bar codes or other identifiers for location or picking one or more items. When using just lasers for bar code type identification such lasers frequently need calibration and human interaction to continue operations. At least one embodiment of the robot enables the cameras to identify bar codes subject to laser confirmation. At least another embodiment of the robot enables the laser to identify bar codes subject to camera confirmation where the system sees and confirms when the laser is pointing to the right bar code or other object. Of course, various other types of applications can be implemented with the system described herein that in one way or another close the loop or sync up the articles or the like sensed by the laser and cameras.

Figure 11:
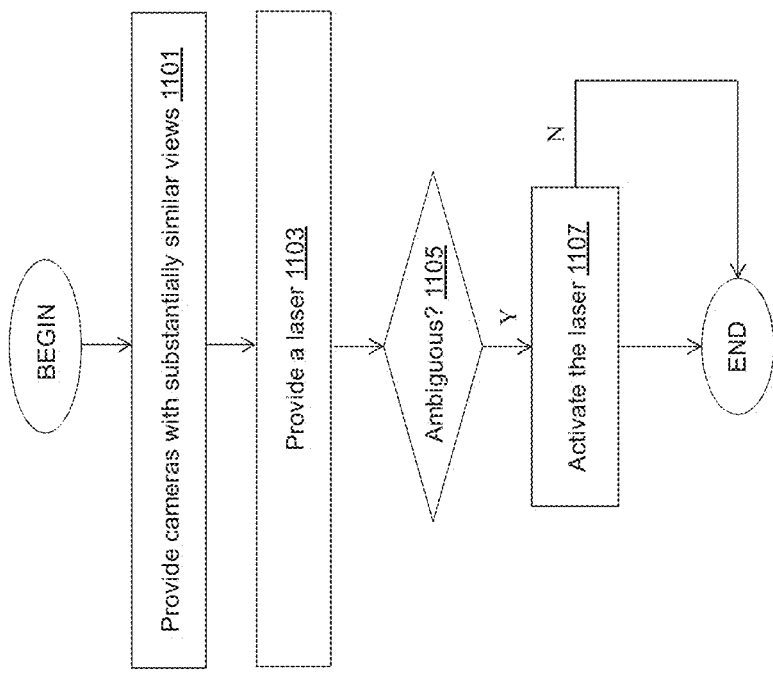
FIG. 11 is an exemplary flow diagram of a method of autonomously operating a vehicle in accordance with illustrative embodiments of the invention.

FIG. 11 shows a method of autonomously operating a vehicle in accordance with illustrative embodiments of the invention. The method includes providing at least two cameras in operable communication with the vehicle for providing substantially similar views relative to the vehicle. These cameras receive information relating to the views (step 1101). The method also provides a laser in operable communication with the vehicle for shining a single discrete mark on at least a portion of the views provided by the cameras (step 1103). Next, the method determines whether the information received by the cameras is ambiguous regarding the views (step 1105). The method thus activates the laser on at least a portion of the views based on whether the information received by the at least two cameras is ambiguous (step 1107). As noted above, the laser shines a discrete mark on the object, thus making the object visible to the cameras 115. Those cameras 115 thus are able to visualize the object and, in conjunction with other logic, determine the distance to, or presence of, the object.

In various embodiments, the processing unit 105 may determine the distance using a conventional algorithm, not discussed herein.

It is understood that the present invention is not limited to the particular components, analysis techniques, etc. described herein, as these may vary. It is also to be understood that the terminology used herein is used for the purpose of describing particular embodiments only, and is not intended to limit the scope of the present invention. It must be noted that as used herein, the singular forms "a," "an," and "the" include plural reference unless the context clearly dictates otherwise. The invention described herein is intended to describe one or more preferred embodiments for implementing the invention shown and described in the accompanying figures.

Unless defined otherwise, all technical and scientific terms used herein have the same meanings as commonly understood by one of ordinary skill in the art to which this invention belongs. Preferred methods, system components, and materials are described, although any methods and materials similar or equivalent to those described herein can be used in the practice or testing of the present invention.

Many modifications and variations may be made in the techniques and structures described and illustrated herein without departing from the spirit and scope of the present invention. Accordingly, the techniques and structures described and illustrated herein should be understood to be illustrative only and not limiting upon the scope of the present invention. The scope of the present invention is defined by the claims, which includes known equivalents and unforeseeable equivalents at the time of filing of this application.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

I claim:

1. A method of autonomously operating an autonomous vehicle, comprising:
   providing a vision system having at least two cameras in operable communication with the autonomous vehicle for providing substantially similar views relative to the vehicle, the at least two cameras receiving information relating to the views and the views at least being substantially in the direction of travel of the vehicle, the two cameras alone at least capable of determining distances between the autonomous vehicle and any objects in the autonomous vehicle's path;
   providing a stand-alone laser in operable communication with the vehicle only for selectively shining a single discrete mark on at least a portion of the views provided to the at least two cameras, wherein a shape of the single discrete mark is determined from a template stored in a memory of the autonomous vehicle;
   determining whether the information received by the at least two cameras is at least ambiguous regarding the views and therefore capable of more than one interpretation with regard to the direction of travel of the vehicle;
   in response to determining that the information received by the at least two cameras is ambiguous, activating the laser to project the single discrete mark into the views provided by the at least two cameras, wherein the single discrete mark is projected in the shape determined from the template stored in the memory of the autonomous vehicle;
   detecting the projected single discrete mark within a corresponding portion of each of the views provided by the at least two cameras, the detecting based on analyzing objects contained in each of the views against expected shape information of the single discrete mark contained within the template;
   in response to detecting the projected single discrete mark within each of the views provided by the at least two cameras, deactivating the laser; and
   calculating a distance to an object upon which the projected single discrete mark impinges, the calculating based on image data contained within the corresponding portion in which the projected single discrete mark was detected in each of the views provided by the at least two cameras, in order to thereby resolve the ambiguity.

2. The method of claim 1, wherein providing the at least two cameras comprises providing the at least two cameras for providing overlapping views relative to the vehicle.

3. The method of claim 1, wherein providing the at least two cameras comprises providing the at least two cameras for providing views relative to the vehicle that overlap by at least a threshold percentage.

4. The method of claim 1, wherein providing the at least two cameras comprises providing the at least two cameras for providing views relative to the vehicle whose fields of view overlap by at least a threshold angle.

5. The method of claim 1, wherein providing the laser comprises providing the laser for shining a dot, a square, a diamond, or an irregular shape.

6. The method of claim 1, wherein providing the laser comprises providing the laser for shining the discrete mark with a curvature.

7. The method of claim 1, wherein providing the laser comprises providing the laser for shining the discrete mark with a straight edge.

8. The method of claim 1, wherein providing the laser comprises providing the laser for shining the discrete mark that has a solid interior.

9. The method of claim 1, wherein determining whether the information is ambiguous comprises:
   determining whether a result of a formula when inputs based on the information in the substantially similar views are used in the formula exceeds a predetermined threshold.

10. The method of claim 1, wherein determining whether the information is ambiguous comprises determining whether a distance to an object in the views can be ascertained.

11. The method of claim 1, wherein determining whether the information is ambiguous comprises determining whether a distance to an object in the views can be logically determined.

12. The method of claim 1, wherein activating the laser based on whether the information is ambiguous comprises activating the laser only when the information is ambiguous.

13. The method of claim 1, wherein activating the laser based on whether the information is ambiguous comprises not activating the laser when the information is not ambiguous.

14. The method of claim 1 wherein activating the laser comprises activating the laser on at least a portion of an object to illuminate the portion to the at least two cameras.

15. The method of claim 14 further comprising using the at least two cameras to determine the distance to the illuminated object.

\* \* \* \* \*